United States Patent Office 3,073,338
Patented Jan. 15, 1963

3,073,338
PRESSURE REGULATOR AND SHUTOFF
VALVE MECHANISM
Robert L. Cholvin, Manhattan Beach, Calif., and Irvin D. Burke, Phoenix, Ariz., assignors to The Garrett Corporation, Los Angeles, Calif., a corporation of California
Filed May 25, 1959, Ser. No. 815,465
17 Claims. (Cl. 137—489)

This invention relates generally to fluid pressure apparatus and is more particularly directed to means for automatically regulating and controlling fluid pressures in a fluid pressure system. Still more particularly, the invention relates to means having a main valve adapted to be disposed in the supply line to a fluid pressure system to regulate pressure supplied thereto, and a pilot valve associated with the main valve to govern the operation thereof in accordance with the regulated pressure.

An object of this invention is to provide pressure regulating and shutoff valve mechanism which will become operative, when fluid under pressure is introduced into the system, to regulate the pressure to a predetermined value, and will resist any tendency of the pressure to vary from such value.

An object of the invention also is to provide pressure regulating and shutoff valve mechanism having a main valve with actuating means therefor responsive in part to inlet pressure to move the main valve toward open position, the mechanism also having means for controlling the actuating means in accordance with variations in the pressures regulated by the main valve.

A further object of the invention is to provide a pressure regulating and shutoff valve mechanism having a main valve with an actuating means responsive in part to inlet pressure to move the main valve toward open position, and a pressure responsive means operative to resist excessive or uncontrolled opening movement of the main valve when fluid under pressure is initially supplied to the inlet of the valve mechanism.

A still further object of the invention is to provide a pressure regulating and shutoff valve mechanism having a main valve and an actuator therefor responsive in part to inlet pressure to move the main valve toward open position, the mechanism including means for controlling the operation of the actuator in accordance with variations in pressures regulated by the main valve, additional means being provided to resist the operation of the actuator, when fluid pressure is initially supplied to the valve mechanism, until the controlling means is in condition to govern the operation of the actuator.

Another object of the invention is to provide a pressure regulating and shutoff valve mechanism having a main valve and actuating means therefor and a bleed type of pilot controlling mechanism for the main valve actuating means, the pilot controlling mechanism being of a differentiator type in which an actuator element with unequal opposed areas is exposed to fluid pressure to govern the operation of the main valve actuating means, the larger area of the actuator element of the pilot controlling mechanism being so arranged and exposed to the fluid pressure as to give an immediate response, thereby preventing sudden surges in controlled pressures due to excessive actuation of the main valve.

Still another object of the invention is to provide a pressure regulating and shutoff valve mechanism having a main valve and a pilot valve for controlling the operation thereof, the main valve having an actuator with a lost-motion connection between it and the main valve, the latter being resiliently maintained in a closed position until the actuator has traveled a predetermined distance in a valve-opening direction whereby excessive surges of pressure in the system, upon initial introduction of fluid under pressure to the valve, will be avoided.

With the foregoing and other objects in mind, which will be made apparent as the description proceeds, the invention consists in the novel features of construction and arrangements of elements exemplified in the form of fluid pressure regulating and shutoff valve mechanism selected for illustration in the accompanying drawing, in which the single FIGURE is a schematic view of the valve mechanism.

More particular reference to the drawing will disclose that the valve mechanism forming the subject matter of the invention includes three major sections designated generally by the numerals 1, 2 and 3: the first section constitutes the main valve portion, section No. 2 a pilot control valve section, and section No. 3 a timer mechanism. In the drawing these sections are shown separately. It should be obvious, however, that they may be combined or enclosed in a single casing or housing.

The main valve section includes a body 4 formed with a valve chamber 5, with which inlet and outlet ports 6 and 7, respectively, communicate. The body or housing 4 is provided with a valve seat 8 between the inlet and outlet ports, and a valve element 10 is supported for movement relative to the seat 8 to control communication between the inlet and outlet ports.

The chamber 5 in the present form of the invention is cylindrical in shape for the reception of a piston 11 constituting an actuator for the valve element 10. The piston is urged in a valve-closing direction by a coil spring 12, a second coil spring 13 being provided to urge the valve element per se in a closed direction. The element 10 and the piston are connected by a lost-motion connection including a stem 14 projecting from the valve element through an opening in the end wall of the piston or actuator 11. The stem is provided with a spring abutment member 15 secured to the stem by nuts 16. These nuts may be adjusted to vary the force of the spring 13. Suitable packing 17 surrounds the stem 14 to prevent leakage between the piston or actuator and the valve stem. When the actuator and valve element occupy the positions shown in the drawing, the actuator closes the inlet port 6 except for a small orifice 18 which establishes communication between the inlet port and the valve chamber at the end of the actuator adjacent the valve element. This orifice 18 may be separately formed, as illustrated, or may be provided between the outer wall of the actuator and the chamber wall. When the valve is not in operation, the actuator and valve element will occupy the positions shown in the drawing wherein the valve element prevents communicaton between the inlet and outlet ports 6 and 7, respectively.

The pilot control valve, section 2, includes a body 20 forming a chamber 21 for a piston element 22 having a plurality of sections 23 and 24 of different cross-sectional areas. The body 20 also provides a bore 25 for the movable reception of a pilot valve rod 26. This valve rod is secured to the piston member 22 for movement therewith. The body 20 is provided with a plurality of ports 27, 28 and 30, the first of which is connected by a passage 31 with the outlet port 7. Port 28 in the body 20 is connected by a passage 32 with the end of the valve chamber 5 at the opposite side of the actuator from the valve element 10. Port 30 in body 20 constitutes an outlet port and communicates with the atmosphere or other region of low pressure.

The valve rod 26 is provided with a reduced portion 33 which serves to establish communication between the ports 28 and 30 in certain positions of the valve rod 26. This communication is controlled through the movement of the valve rod in response to corresponding movement

We claim:

1. A pressure regulating and shutoff valve comprising: valve means operative to control the flow of fluid through inlet and outlet passages associated therewith; actuating means operatively connected to said valve; control means operatively disposed relative to said actuating means, said control means causing said actuator to regulate said valve according to the outlet pressure thereof; and timer means operatively related to said valve to delay the actuation of the latter for a predetermined period after the initial introduction of fluid under pressure to said inlet.

2. A pressure regulating and shutoff valve comprising: housing means formed to include a valve seat positioned between inlet and outlet passages; movable wall means in said housing to define first and second opposed chambers, said chambers being in communication with a source of fluid under pressure; valve means formed for engagement with said seat and disposed for movement with said movable wall; control means responsive to pressure at the outlet side of said valve seat, said control means being disposed to vent one of said chambers to regulate flow through said valve according to said outlet pressure; and timer means operatively disposed relative to said valve to delay the actuation thereof for a predetermined period after the initial introduction of fluid under pressure to said inlet.

3. A pressure regulating and shutoff valve comprising: housing means formed to include a valve seat between inlet and outlet passages; movable wall means in said housing to define opposed first and second chambers therein, said chambers being in communication with a source of fluid under pressure; valve means movable relative to said seat and having a lost-motion connection with said movable wall; control means responsive to variations in pressure at the outlet side of said valve seat to regulate flow through said valve; and timer means operatively disposed relative to said valve to delay the operation thereof for a predetermined period after the initial introduction of fluid under pressure to said inlet.

4. A pressure regulating and shutoff valve comprising: housing means formed to include a valve seat between inlet and outlet passages; means forming a first movable wall in said housing to define opposed first and second chambers, said chambers being in communication with a source of fluid under pressure; valve means movable relative to said seat and having a lost-motion connection with said first wall; control means having a control housing and means forming a second movable wall, the latter being responsive to the fluid pressure in said outlet; a pilot valve connected for movement with said second wall and disposed to vent one of said chambers to regulate flow through said valve according to fluid pressure in said outlet; and timer means operatively disposed relative to said valve to delay the actuation of the latter for a predetermined period after the initial introduction of fluid under pressure to said inlet.

5. A pressure regulating and shutoff valve comprising: housing means formed to include a valve seat positioned between inlet and outlet passages; means forming a movable wall in said housing to define opposed first and second chambers, said chambers being in communication with a source of fluid under pressure; closure means movable relative to said seat and having a lost-motion connection with said wall; pressure differentiator means responsive to the pressure at the outlet side of said seat; means responsive to a signal from said differentiator to vent one of said chambers to move said closure means and regulate flow from said inlet to said outlet passage according to fluid pressure in said outlet; and timer means communicating with said housing and serving to delay actuation of the closure means for a predetermined period after the introduction of fluid under pressure to said inlet.

6. A pressure regulating and shutoff valve comprising: body means defining a valve chamber with inlet and outlet ports separated by a valve seat; a valve element supported for movement in said chamber relative to said seat to control fluid flow therethrough; a fluid pressure responsive actuator member operatively disposed in said chamber relative to said valve element, fluid under pressure applied to said inlet port serving to apply valve opening and closing forces to said actuator member; means operative when fluid under pressure is initially supplied to said inlet port to cause the valve closing force to exceed the valve opening force for a predetermined period; and means responsive to variations in pressure at the outlet side of said valve seat to control said valve opening and closing forces and the movement of said actuator member in response thereto.

7. A pressure regulating and shutoff valve comprising: body means defining a valve chamber with inlet and outlet ports separated by a valve seat; a valve element supported for movement in said chamber relative to said seat to control fluid flow therethrough; a fluid pressure responsive actuator member operatively disposed in said chamber relative to said valve element, fluid under pressure applied to said inlet port serving to apply valve opening and closing forces to said actuator member; means operative when fluid under pressure is initially supplied to said inlet port to cause the valve closing forces to exceed the valve opening force for a predetermined period; means responsive to variations in pressure at the outlet side of said valve seat to control said valve opening and closing forces and the movement of said actuator member in response thereto, said means having a bleed valve to govern the application of fluid pressure to said actuator member; and a fluid pressure responsive actuating device operatively related to said bleed valve.

8. A pressure regulating and shutoff valve comprising: body means defining a valve chamber with inlet and outlet ports separated by a valve seat; a valve element supported for movement in said chamber relative to said seat to control fluid flow therethrough; a fluid pressure responsive actuator member operatively disposed in said chamber relative to said valve element, fluid under pressure applied to said inlet port serving to apply valve opening and closing forces to said actuator member; means operative when fluid under pressure is initially supplied to said inlet port to cause the valve closing force to exceed the valve opening force for a predetermined period; means responsive to variations in pressure at the outlet side of said valve sat to control said valve opening and closing forces and the movement of said actuator member in response thereto, said means having a bleed valve to govern the application of fluid pressure to said actuator member; and a fluid pressure responsive element having opposed differential areas exposed to pressure at the outlet side of said valve seat to effect the operation of said bleed valve.

9. A pressure regulating and shutoff valve comprising: body means defining a valve chamber with inlet and outlet ports separated by a valve seat; a valve element supported for movement in said chamber relative to said seat to control fluid flow therethrough; a fluid pressure responsive actuator member operatively disposed in said chamber relative to said valve element, fluid under pressure applied to said inlet port serving to apply valve opening and closing forces to said actuator member; means operative when fluid under pressure is initially supplied to said inlet port to cause the valve closing force to exceed the valve opening force for a predetermined period; means responsive to variations in pressure at the outlet side of said valve seat to control said valve opening and closing forces and the movement of said actuator member in response thereto, said means having a bleed valve to govern the application of fluid pressure to said actuator member; a fluid pressure responsive element operatively related to said bleed valve, said element having opposed differential areas; means applying fluid pressure from the outlet side of said seat to one of said areas; and means establishing limited communication between fluid pressure receiving regions to which said areas are exposed.

10. A pressure regulating and shutoff valve comprising: body means defining a valve chamber with inlet and outlet ports separated by a valve seat; a valve element supported for movement in said chamber relative to said seat to control fluid flow therethrough; a fluid pressure responsive actuator member operatively disposed in said chamber relative to said valve element, fluid under pressure applied to said inlet port serving to apply valve opening and closing forces to said actuator member; means operative when fluid under pressure is initially supplied to said inlet port to cause the valve closing force to exceed the valve opening force for a predetermined period; means responsive to variations in pressure at the outlet side of said valve seat to control said valve opening and closing forces and the movement of said actuator member in response thereto, said means having a bleed valve to govern the application of fluid pressure to said actuator member; a fluid pressure responsive element operatively related to said bleed valve, said element having opposed differential areas; means applying fluid pressure from the outlet side of said seat to one of said areas; means establishing limited communication between fluid pressure receiving regions to which said areas are exposed; and resilient means tending to urge said fluid pressure responsive device and said bleed valve to predetermined positions.

11. A pressure regulating and shutoff valve comprising: body means defining a valve chamber with inlet and outlet ports separated by a valve seat; a valve element supported for movement in said chamber relative to said seat to control fluid flow therethrough; a fluid pressure responsive actuator member operatively disposed in said chamber relative to said valve element, fluid under pressure applied to said inlet port serving to apply valve opening and closing forces to said actuator member; means operative when fluid under pressure is initially supplied to said inlet port to cause the valve closing force to exceed the valve opening force for a predetermined period; means responsive to variations in pressure at the outlet side of said valve seat to control said valve opening and closing forces and the movement of said actuator member in response thereto, said means having a bleed valve to govern the application of fluid pressure to said actuator member; a fluid pressure responsive element operatively related to said bleed valve, said element having opposed differential areas; means applying fluid pressure from the outlet side of said seat to one of said areas; means establishing limited communication between fluid pressure receiving regions to which said areas are exposed; resilient means tending to urge said fluid pressure responsive device and said bleed valve to predetermined positions; and means for adjusting said resilient means.

12. A pressure regulating and shutoff valve comprising: body means defining a valve chamber with inlet and outlet ports separated by a valve seat; a valve element supported for movement in said chamber relative to said seat to control fluid flow therethrough; a fluid pressure responsive actuator member operatively disposed in said chamber relative to said valve element, fluid under pressure applied to said inlet port serving to apply valve opening and closing forces to said actuator member; means operative when fluid under pressure is initially supplied to said inlet port to cause the valve closing force to exceed the valve opening force for a predetermined period; means responsive to variations in pressure at the outlet side of said valve seat to control said valve opening and closing forces and the movement of said actuator member in response thereto, said means having a bleed valve to govern the application of fluid pressure to said actuator member; means for operating said bleed valve having a piston with opposed differential areas; means for applying fluid pressure from the outlet side of said seat to one of the differential areas of said piston to move said bleed valve and cause said actuator member to urge said valve toward said seat; restricted passage means extending between the differential areas of said pistons; and resilient means tending to maintain said piston in a predetermined position.

13. A pressure regulating and shutoff valve comprising: body means defining a valve chamber with inlet and outlet ports; a valve element supported for movement in said chamber to control communication between said ports; a fluid pressure responsive actuator member operatively disposed relative to said valve element; means establishing fluid passages between said inlet port and first and second opposed surfaces of said actuator member, the passage leading to the first surface of said actuator member having first and second portions disposed in parallel flow relation, the first portion containing a restriction; pressure responsive valve means operative a predetermined period after fluid pressure is initially supplied to said inlet port to interrupt fluid flow through the second portion of said passage; means responsive to variations in pressure in the outlet port to control the movement of said actuator member, said means having a bleed valve to govern the application of pressure to the first surface of said actuator member; and a second actuator operatively disposed relative to said bleed valve, said second actuator having means forming a chamber; a movable wall assembly with differential areas dividing said chamber into sections having restricted communication; means establishing communication between said outlet port and the chamber section at the large area of said movable wall assembly; and means tending to maintain said bleed valve in a predetermined position.

14. A pressure regulating and shutoff valve comprising: body means defining a valve and actuator chamber with inlet and outlet ports; a valve element supported for movement in said chamber to control communication between said ports; an actuator member disposed for movement in said chamber; a lost-motion connection between said actuator and said valve element; means establishing fluid passages between said inlet port and first and second opposed surfaces of said actuator member, the passage leading to the first surface of said actuator member having first and second portions disposed in parallel flow relation, the first portion containing a restriction; pressure responsive valve means operative a predetermined period after fluid pressure is initially supplied to said inlet port to interrupt fluid flow through the second portion of said passage; means responsive to variations in pressure in the outlet port to control the movement of said actuator member, said means having a bleed valve to govern the application of pressure to the first surface of said actuator member; a second actuator operatively disposed relative to said bleed valve, said second actuator having means forming a chamber; a differential piston disposed for movement in said chamber to effect the operation of said bleed valve; means establishing communication between said outlet port and the part of the chamber at the larger side of said piston; means establishing restricted communication between the chamber at opposite sides of said piston; and spring means tending to move said piston in opposition to the pressure applied to the larger side of said piston.

15. A pressure regulating and shutoff valve comprising: valve means operative to control the flow of fluid between inlet and outlet passages associated therewith; a first means tending to retain said valve means in a closed position; fluid pressure responsive actuating means operatively related to said valve; a second means operative upon initial introduction of fluid under pressure to the valve inlet passage to apply substantially equal forces to opposed portions of said pressure responsive actuating means, said first means being operative to maintain said valve means in the closed position; a third means operative after a predetermined time interval to vary the forces applied to the opposed portions of said pressure responsive actuating means to move said valve means toward an open position; and control means operatively related to said valve and pressure responsive actuating means to govern the forces applied to the opposed portions of the latter and control the movement of said valve means, said control means being responsive to fluid pressures in the valve outlet passage.

16. A pressure regulating and shutoff valve comprising: valve means operative to control the flow of fluid between inlet and outlet passages associated therewith; a first means normally tending to retain said valve means in a position to prevent fluid flow between the inlet and outlet passages; fluid pressure responsive actuating means operatively related to said valve means to effect movement thereof toward a position establishing fluid flow between the inlet and outlet passages; a second means operative upon initial introduction of fluid pressure to the valve inlet passage to apply substantially equal forces to opposed portions of said fluid pressure responsive actuating means, said first means being operative to maintain said valve means in the closed position; a third means operative after a predetermined time interval to reduce the application of force to one of the opposed portions of said pressure responsive actuating means whereby the force applied to the other portion moves the valve means toward open position; and control means operatively related to said fluid pressure responsive actuating means to vary the application of force applied to said one of the opposed portions of said pressure responsive actuating means in accordance with fluid pressures in the valve outlet passage.

17. A pressure regulating and shutoff valve comprising: body means defining a valve chamber with inlet and outlet ports separated by a valve seat; a valve element supported for movement in said chamber relative to said seat to control fluid flow therethrough; a fluid pressure responsive actuator member operatively disposed in said chamber relative to said valve element; means operative when fluid under pressure is initially supplied to said inlet port to apply differential valve closing and valve opening forces to said actuator, said valve closing force being greater than said valve opening force; and control means operative after a predetermined time interval to reduce said valve closing force below said valve opening force, said control means including means responsive to variations in pressure at the outlet side of said valve seat to control the movement of said actuator member.

References Cited in the file of this patent

UNITED STATES PATENTS

| | | |
|---|---|---|
| 802,496 | Collin | Oct. 24, 1905 |
| 1,504,620 | Good | Aug. 12, 1924 |
| 2,163,597 | Grove | June 27, 1939 |
| 2,596,368 | Brunton | May 13, 1952 |

FOREIGN PATENTS

| | | |
|---|---|---|
| 832,502 | France | Sept. 28, 1938 |

Jan. 15, 1963
W. STELZER
3,073,339
CHECK VALVES
Filed May 1, 1959
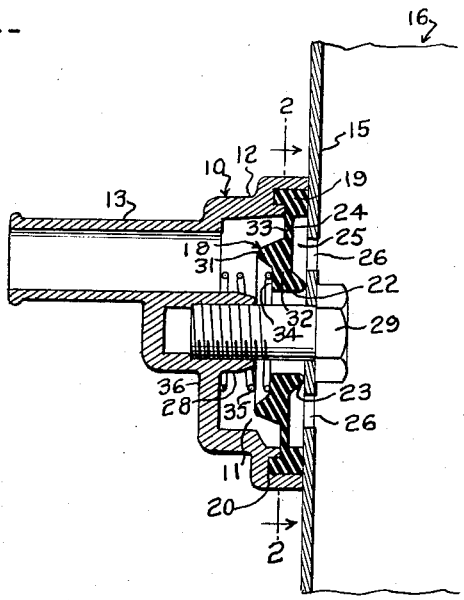
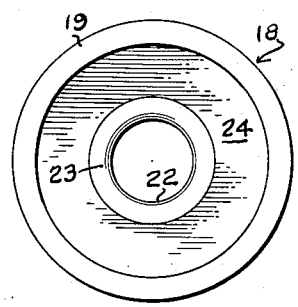
INVENTOR
WILLIAM STELZER
BY John V. Phillips
ATTORNEY